(12) United States Patent
Williams et al.

(10) Patent No.: US 7,460,536 B1
(45) Date of Patent: Dec. 2, 2008

(54) USER AND SESSION IDENTIFICATION BASED ON CONNECTIONS, PROTOCOLS AND PROTOCOL FIELDS

(75) Inventors: Aaron Williams, Fremont, CA (US); Prakash Jayaraman, Fremont, CA (US)

(73) Assignee: Network Equipment Technologies, Fremont, CA (US)

( * ) Notice: Subject to any disclaimer, the term of this patent is extended or adjusted under 35 U.S.C. 154(b) by 766 days.

(21) Appl. No.: 10/651,542

(22) Filed: Aug. 29, 2003

Related U.S. Application Data (60) Provisional application No. 60/455,736, filed on Mar. 17, 2003.

(51) Int. Cl.
*H04L 12/54* (2006.01)
*H04L 12/28* (2006.01)
*H04L 12/56* (2006.01)

(52) U.S. Cl. .................. 370/392; 370/401; 370/428

(58) Field of Classification Search .......... 370/230, 370/332, 444, 355, 356, 400, 401, 428, 392, 370/395.3, 395.31; 709/240
See application file for complete search history.

(56) References Cited

U.S. PATENT DOCUMENTS

| | | | |
|---|---|---|---|
| 6,104,700 A * | 8/2000 | Haddock et al. ............ 370/235 |
| 6,442,158 B1 * | 8/2002 | Beser .......................... 370/352 |
| 6,449,251 B1 * | 9/2002 | Awadallah et al. .......... 370/229 |
| 6,625,124 B1 * | 9/2003 | Fan et al. ..................... 370/235 |
| 6,822,940 B1 * | 11/2004 | Zavalkovsky et al. ....... 370/237 |
| 6,957,281 B2 * | 10/2005 | Mann et al. ..................... 710/5 |
| 2004/0057433 A1 * | 3/2004 | Daniel et al. ................ 370/392 |
| 2004/0223472 A1 * | 11/2004 | Sankaran et al. ............ 370/335 |

\* cited by examiner

*Primary Examiner*—Chau Nguyen
*Assistant Examiner*—Hicham B Foud
(74) *Attorney, Agent, or Firm*—Townsend and Townsend and Crew, LLP (57) ABSTRACT

Systems and methods for applying a service level to a user's packets of data are provided. Packets of data for multiple users may be transferred through a single connection. Where data for multiple users is transferred through a single connection, a specific service level may be applied for each users' packets of data. Methods is provided that includes the steps of associating a service level with a plurality of sessions; receiving a data packet from a connection; determining a session associated with the data packet; determining a session identifier of a session associated with the data packet; determining a service level associated with the session identifier; and transferring the data packet at the determined the service level. Systems for associating a service level with a session and applying the service level to data packets associated with session is provided.

24 Claims, 4 Drawing Sheets

USER AND SESSION IDENTIFICATION BASED ON CONNECTIONS, PROTOCOLS AND PROTOCOL FIELDS

CROSS-REFERENCES TO RELATED APPLICATIONS

The present application is a non-provisional of and claims priority from U.S. Provisional Application No. 60/455,736, filed Mar. 17, 2003, the entire contents of which are herein incorporated by reference for all purposes.

BACKGROUND OF THE INVENTION

The present invention generally relates to telecommunications systems and more specifically to methods and apparatus for applying a level of service for data packets based on a subscriber associated with each packet.

When a subscriber is offered data services, the limits of a physical connection determine a data rate that may be offered to the subscriber. For example, the physical connection may be based on an asynchronous transfer mode (ATM) port, a digital subscriber line (DSL) connection, a direct physical connection, a neighborhood aggregator, etc. Each different physical connection may be able to transfer data at a certain data rate. The data rate offered to a subscriber is not a guaranteed rate but rather a maximum rate that data may be transferred through the physical connection.

Typically, multiple subscribers transfer data through the same physical connection. Data packets from different subscribers are not handled differently by devices routing the data for the connection. Rather, data packets from the same connection, no matter where they originated from, are transferred according to the physical limitations of the connection.

Different subscribers may be running different types of applications. For example, one subscriber may need a connection to download and view a video on demand movie. Another subscriber may want to browse the World Wide Web (WWW). Each of the subscribers will most likely desire a different data rate for their data traffic. For example, the subscriber using video on demand will most likely desire a high data transfer rate while the subscriber browsing the World Wide Web may not need such a high data rate. However, data packets are transferred at the same data rate for the two subscribers in the connection. Thus, available bandwidth in the connection may not satisfy the video on demand subscriber because data packets from the other subscriber are being given the same priority as data from the video on demand movie. Moreover, the subscriber browsing the WWW may have his or her data transfer rate degraded because the video on demand subscriber has used up most of the bandwidth for the physical connection. Accordingly, different subscribers on the same connection may not have their bandwidth needs met.

BRIEF SUMMARY OF THE INVENTION

Embodiments of the present invention relate to applying a service level to a user's data packets. When multiple users' transfer data through a single connection, a specific service level may be applied for each user's data packets.

In one embodiment, a method for applying a service level to a packet of data is provided. The method comprises: receiving a data packet from a connection; determining a session associated with the data packet; determining a service level based on the connection and the session; and transferring the data packet at the determined the service level.

In another embodiment, a method for applying a service level to a packet of data is provided. The method comprises: initializing a user device for transferring data packets through a connection, the connection transferring data packets for a plurality of user devices including the user device; determining a service level that is associated with the user device; storing the service level; receiving a plurality of data packets from the connection, the data packets received from the plurality of user devices; associating a packet in the plurality of data packets with the user device, the association made based on a protocol associated with the data packet and the connection in which the data packet was received; determining a service level to apply to the data packet based on the stored service level associated with the user device; and applying the service level to the data packet.

In yet another embodiment, a method for determining and applying a service level to a data packet is provided. A plurality of data packets of a plurality of protocols are received from a plurality of connections. The method comprises: for a received packet in the plurality of packets, determining a connection in the plurality of connections in which the packet was received; determining a protocol in the plurality of protocols associated with the received packet; determining a session for the received packet based on the determined protocol and the determined connection; determining a service level that is associated with the session; and transferring the received packet at the service level.

In another embodiment, an apparatus for applying a service level to data packets is provided. The apparatus comprises: a connection identifier configured to identify a connection in which a data packet was received; a protocol identifier configured to identify protocol information for the data packet; a session identifier configured to determine a session based on the identified connection and identified protocol information; a service level determiner configured to determine a service level associated with the identified session; and a transmitter configured to transfer the data packet at determined service level.

A further understanding of the nature and the advantages of the inventions disclosed herein may be realized by reference of the remaining portions of the specification and the attached drawings.

DETAILED DESCRIPTION OF THE INVENTION

Figure 1:
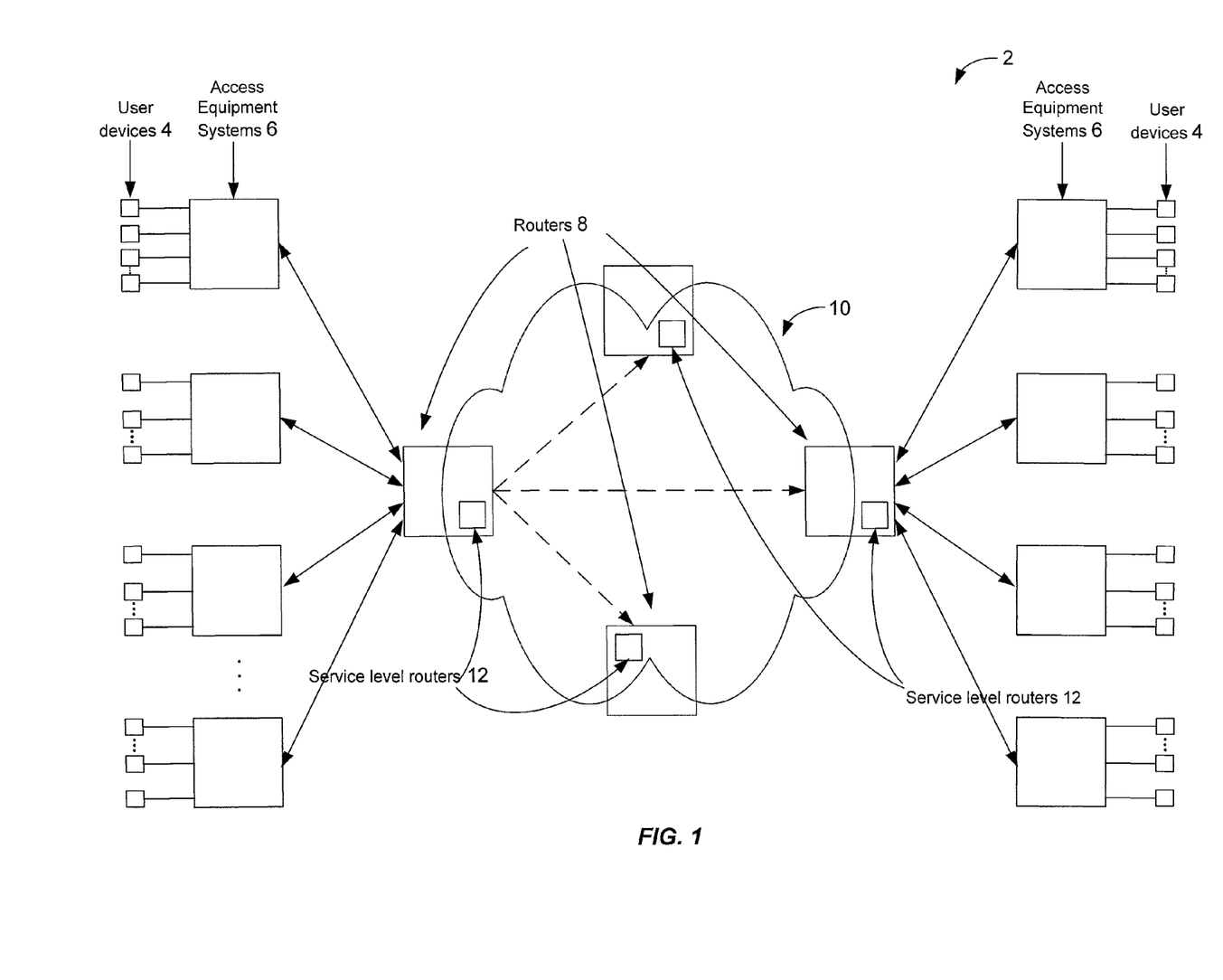
FIG. 1 depicts a simplified block diagram of a telecommunications system according to one embodiment of the present invention.

FIG. 1 depicts a simplified block diagram of a telecommunications system 2 according to one embodiment of the present invention. Telecommunications system 2 includes user devices 4, access equipment systems 6, routers 8, a network 10, and service level routers 12.

User devices 4 are computing devices associated with users that communicate data. Examples include personal computers (PCs), customer premise equipment (CPE), user terminals and modems, workstations, personal digital assistants (PDAs), cellular phones, personal PCs, switches, servers and the like. The data are transmitted to access equipment systems 6 through communication lines.

Access equipment systems 6 aggregate and multiplex the data received from user devices 4. Examples of access equipment systems 6 include digital subscriber line access multiplexer (DSLAM), multiplexers, etc. Data received at access equipment systems 6 are then sent to routers 8. Data from a single access equipment system 6 are typically sent in a specific data format and a specific data rate. For example, the data formats include SONET/SDH (OC3, OC12, OC48, etc.), DS3/E3, Ethernet, Gigabit Ethernet, etc. Data in these formats are also transferred at various data rates, where a fixed data rate is associated with a format. Also, the type of physical connection may limit the data rate in which data is transferred. For example, ATM circuits may transfer data at one rate and SONET networks may transfer data at another rate.

Router 8 receives the data from access equipment systems 6. Router 8 processes the data in data packets and may send the data packets to one or more other routers 8. Although data packets are referred to, it will be recognized that data may be transferred by other means, such as a public switched telephone network (PSTN) or a wireless network. Data packets are then sent to either another access equipment system 6 and/or to another user device 4 through network 10. Network 10 may be any network, such as the Internet, a wireless network, a wireline network, etc.

Embodiments of the present invention may be included in routers 8 in FIG. 1. For example, a service level router 12 is provided to apply a certain data rate to data packets depending on a user associated with the data packets. Data packets may be received from a connection that is transferring data packets for multiple users. Each user's data packets are identified and a specific service level is applied to the data packets depending on the user.

Figure 2:
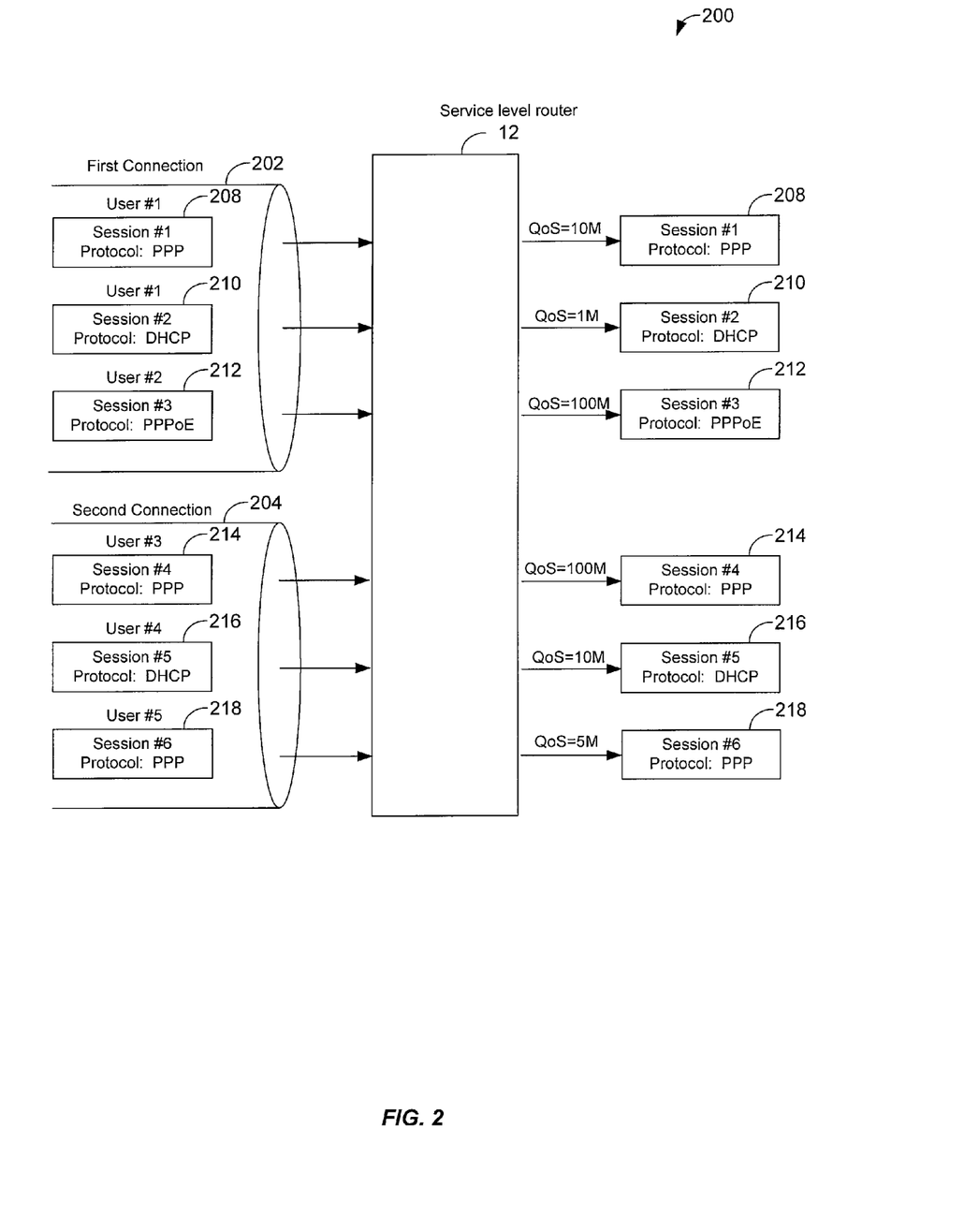
FIG. 2 illustrates a system for applying a service level to individual user's data packets according to one embodiment of the present invention.

FIG. 2 illustrates a system 200 for applying a service level to individual user's data packets according to one embodiment of the present invention. As shown, a first connection 202 and the second connection 204 transfer data packets from multiple users to service level router 12.

First connection 202 and second connection 204 may be any type of physical connection. For example, connections 202 and 204 may be a physical connection such as an asynchronous transfer mode (ATM), Ethernet, or packet over SONET connection. Each connection is connected to an interface at router 8. The interface may be a plurality of ports where each port is connected to a specific connection. Thus, connection 202 may be connected to a first port and connection 204 may be connected to a second port. Examples of ports include an asynchronous transfer mode (ATM) port, an Ethernet port or a Packet-over-SONET port. On an ATM port, a combination of VPI and VCI identifies a connection. An Ethernet port may be logically subdivided into multiple logical Ethernet ports using VLAN tags placed on the Ethernet frame. Hence, the Ethernet port may be considered a single connection. If VLANs are configured on the Ethernet port, each VLAN-tag is considered a connection. Similarly a SONET-port can be used as a single connection or subdivided into logical connections using Virtual Tributaries. Service level router 12 can then identify connection 202 and 204 based on the port or logical port in which data was received.

As shown, each connection 202 and 204 can transfer data for a simple user or multiple users. For example, in connection 202, a user #1 is transferring one or more data packets 208 and one or more data packets 210, and a user #2 is transferring one or more data packets 212. Although only one data packet is shown, it will be recognized that when one data packet for a user is shown, it may represent a stream of data packets that are received for that user.

Each data packet is associated with a session and a protocol. For example, data packet 208 is associated with session #1 and a point to point protocol (PPP), data packet 210 is associated with a session #2 and a dynamic host configuration protocol (DHCP) and data packets 212 are associated with a session #3 and a point to point protocol over Ethernet (PPPoE). A session is a series of communications initiated by a user or a device. For example, a PPP session is initiated when the user logs into the network with a user-id and password. A DHCP session is initiated when a user device obtains an IP address from the network. A user may initiate multiple sessions on the same device. Once a session is initiated, a logical interface is created on the user's machine. The logical interface is identified by an IP (Internet Protocol) address. The logical interface is used to initiate communications with service level router 12. In one example, data packets associated with the session #1 are being received from a device associated with user #1 through connection 202. The device may be user devices 4, access equipment system 6, or any other device associated with user #1.

It will be understood that a user may be sending data packets through multiple sessions. For example, a user may be using a computer that is downloading a video on demand movie in a first session and the user may be browsing the WWW in a second session.

Connection 202 may also send data packets in different protocols. A protocol defines a format that is used to send the packet. Data packets include information that can be used to identify the data packet's protocol. For example, layer-2 or layer-3 information may define a protocol. Service level router 12 may use information found in a data packet to determine the protocol of the data packet. In one embodiment, each session sends data packets in the same protocol.

Connection 204 is also transferring one or more data packets 214, 216, and 218 from multiple users. As shown, user #3, user #4, and user #5 are associated with different sessions and various protocols. Accordingly, connections 202 and 204 each transfer data from multiple users and possibly different protocols. In order to apply different service levels to each session associated with a user, service level router 12 identifies each data packet received and associates the data packet with a session. In one embodiment, service level router 12 uses connection information and protocol information for the data packet to determine an associated session for the data packet. Once the session is determined, a predetermined service level is applied to the data packets for that session. The methods that may be used to identify a user's data packets will be described in more detail below.

After each user's data packets are identified by a session, a service level may be applied to those data packets. The service level guarantees a certain data rate that a user's data packets will be transferred at. In one embodiment, a service level may be referred to as a quality of service (QoS) or a class of service (CoS). A QoS is a guarantee that data packets will be transferred at a certain data rate for a user. A CoS is a grouping of traffic based on the protocol parameters. A set of data packets in the same class of service will be treated in a similar manner. The behavior of the data packets is determined by the Class of Service. Quality of Service numerically identifies the exact bandwidth-related (e.g., data rate) parameters for a data packet stream. Two data packet streams may have the same CoS, but different bandwidths and hence different QoSs. As shown, data packets 208 for session #1 are transferred at a QoS of 10 Megabit/second (Mb/S), data packets 210 for session #2 are transferred at 1 Mb/S, and data packets 212 for session #3 are transferred at 100 Mb/S per second. For connection 204, data packets 214 received for session #4 are transferred at QoS of 100 Mb/S per session, data packets 216 received for a session #5 are transferred at 10 Mb/S, and data packets 218 received for a session #6 are transferred at 5 Mb/S. Accordingly, each session in a connection may have a different QoS applied to data packets being transferred. A connection may transfer data packets from different users, service level router 12 identifies the data packets, determines a session associated with the data packets, and applies a quality of service based on the session. Users may then be offered specific service level agreements even though multiple users may be transferring data on the same connection.

Figure 3:
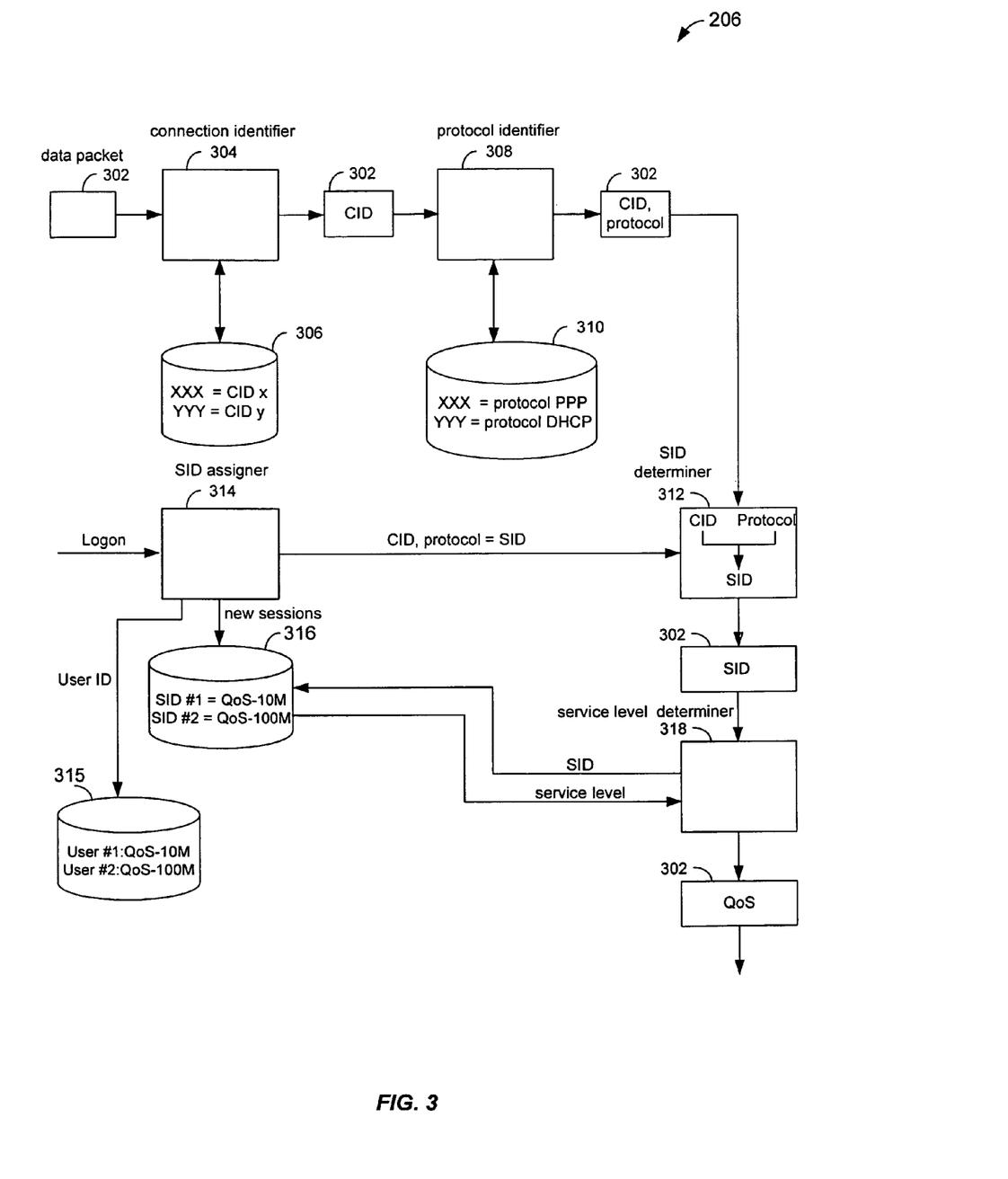
FIG. 3 illustrates an embodiment of a service level router according to the present invention.

FIG. 3 illustrates an embodiment of service level router 12 according to the present invention. Before data packets 302 for specific users are sent to service level router 12, in one embodiment, service levels for the users are predetermined by SID assigner 314. The service levels are applied on a session by session basis to data packets for users. In one embodiment, identifiers, such as session identifiers (SIDs), are used to identify each session. For example, when a user logs on or connects to router 8, SID assigner 314 determines a session the user will be sending data packets through. An identifier (SID) for the session is then determined and a service level associated with the session and the user will be assigned to the SID. For example, a user ID is used to look up a QoS in a database 315. An SID for a new session is then created in a database 316 for the QoS.

In one embodiment, a SID is determined based on the protocol and connection used in transferring data packets. For example, SIDs are assigned based on an underlying layer 2 or layer 3 protocol and the physical interface (port) associated with the connection.

Once the service levels are associated with the corresponding SIDs, data packets 302 are received at a connection identifier 304. Data packets 302 may be data packets from multiple users and received from multiple connections. For example, data packets 302 may be received for any users shown in connections 202 and connections 204.

Connection identifier 304 is configured to determine a connection identifier (CID) that identifies the connection in which each data packet 302 was received. In one embodiment, data packets 302 are received at various interfaces, such as ports or logical ports, in router 8. For example, connection 202 may be connected to a first port and the connection 204 may be connected to a second port. Connection identifier 304 determines the port that data packets are received from and an identifier for the port, such as a port number.

A CID for the port is then determined. For example, a CID may be an identifier for an ATM port, a VPI and VCI combination for ATM ports, a port and optional VLAN tag for Ethernet ports, or a port for a packet over SONET connection.

In one embodiment, if an Ethernet connection is used, a CID may be based on a port and a source media access control (MAC) address for additional flexibility. By doing this, it is possible to assign a set of access control lists (ACLs) or a policing engine to each host or router connected to an interface without requiring IP processing. If the host is a router, the host behind the router may be treated as a session by using their source IP address as a differentiator, effectively abstracting the machine as a single session to apply specific quality of service.

In one embodiment, if the port numbers are not used as the CID, connection identifier 304 communicates with a database 306 to determine a CID to apply to a data packet 302. Database 306 may include port numbers that correspond to certain CIDs. For example, the port XXX may be assigned the CID X and the port YYY may be assigned the CID Y.

When the CID is determined, data packet 302 and the determined CID are sent to a protocol identifier 308. Protocol identifier 308 is configured to determine protocol information associated with data packet 302. Protocol information may include, but is not limited to, information for the protocols PPP, PPPoE, DHCP, and the like.

Because more than one subscriber can use a single CID, each user's session is separated because each user may have a separate service level agreement. Thus, a second identifier, a session identifier (SID), is assigned to each user's session. Protocol information for the data packet 302 is identified and used to determine the SID. In one embodiment, protocol identifier 308 may use information found in data packet 302, such as a protocol field, to determine the protocol associated with data packet 302. In one embodiment, protocol identifier 308 communicates with a database 310 to determine the protocol associated with packet 302. For example, if the protocol information is XXX, the protocol is a protocol PPP and if the information is YYY the protocol is protocol DHCP. Once the protocol is determined, protocol identifier 308 sends data packet 302 along with the determined CID and the protocol to SID determiner 312.

SID determiner 312 is configured to use the CID and protocol to determine a session associated with each data packet 302. In one embodiment, the session is determined by identifying a SID for data packet 302. In this case, information, such as the CID and protocol information is sent to SID assigner 314, which determines the appropriate SID for data packet 302. For example, certain combinations of CIDs and protocol information may correspond to different SIDs.

After assigning the SID to data packet 302, the SID may be mapped to a virtual router (VR), an access control list identifier (ACLID), a policing identifier, and any other necessary information for offering services to the user and the session. The information is used in transferring data packet 302.

A virtual router offers routing services to network 10. Packets from two different customers connected to two different virtual routers may take different routes through network 10. Services such as virtual private networks may be offered on one virtual router and not on another. One virtual router may be able to access certain portions of the network, while the others are not able to.

Access Control Lists specify patterns of traffic streams and are used to filter malicious traffic. Applications such as firewalls make use of access control lists. A system may have a number of access control lists. An access control list may be defined for a user to filter out only malicious email, while another access control list may be defined for another user to filter out WWW traffic. By identifying the session from the data packets, it becomes possible to apply appropriate ACL services to the user.

Policing is a method by which a user's traffic rate is limited to a maximum amount. If the user's instantaneous traffic exceeds the specified policing rate, the excess traffic will be discarded. By applying a specific rate, the service provider ensures that the equipment is not overrun thereby avoiding traffic congestion. It is possible to offer differentiated premium services to a user by allowing high instantaneous traffic rates to specific users. It is usually accomplished by assigning a unique policing engine to the traffic of a session.

The following show examples in determining SIDs for sessions associated with users. Although the following examples are shown, it would be understood that a person skilled in the art will appreciate other methods that may be used to assign SIDs.

PPP over ATM or a serial point-to-point link allows only one subscriber per connection so a CID can map directly to a SID. This is because only one user may be on a connection and a CID alone is enough to identify the user or session.

For PPPoE, however, there can be multiple PPPoE sessions sharing a single connection or CID. Each PPPoE session is identified by a PPPoE Session Identifier. This identifier is carried in all the packets belonging to that session. To differentiate each session for users, a combination of the CID and a PPPoE SID field is used to uniquely identify sessions for users.

For DHCP, a SID is assigned to each session for users based on the CID and a source IP address. The CID is included because it is possible that there may be overlapping IP address spaces between different CIDs. Using the source IP address rather than another address, such as a source MAC address, an SID will not be changed when a user changes equipment because the source IP address will not be changed but a MAC address may be.

After the SID for the user session is determined, a service level may then been determined for the SID. SID determiner 312 sends data packet 302 along with the SID to service level determiner 318, which determines the service level to apply to data packet 302. For example, a user's data packets may be assigned a particular quality of service (QoS) and/or class of service (CoS) when communicating with a service provider. As mentioned above, the assigned service levels for SIDs have been stored in database 316. As shown, a SID #1 for a first user may have been assigned a QoS of 10 Mb/s and a SID #2 and may have been assigned a QoS of 100 Mb/s. Service level determiner 318 communicates with database 316 to determine the service level associated with the SID. For example, if SID #1 is associated with data packet 302, a QoS of 10 Mb/s will be applied to data packet 302. Service level determiner 318 applies the determined service level to data packet 302.

Accordingly, with the QoS applied, data packet 302 is transferred through router 8 at the determined QoS. In one embodiment, router 8 may assign different data packets 302 to the different queues depending on the determined QoS of each packet 302.

Figure 4:
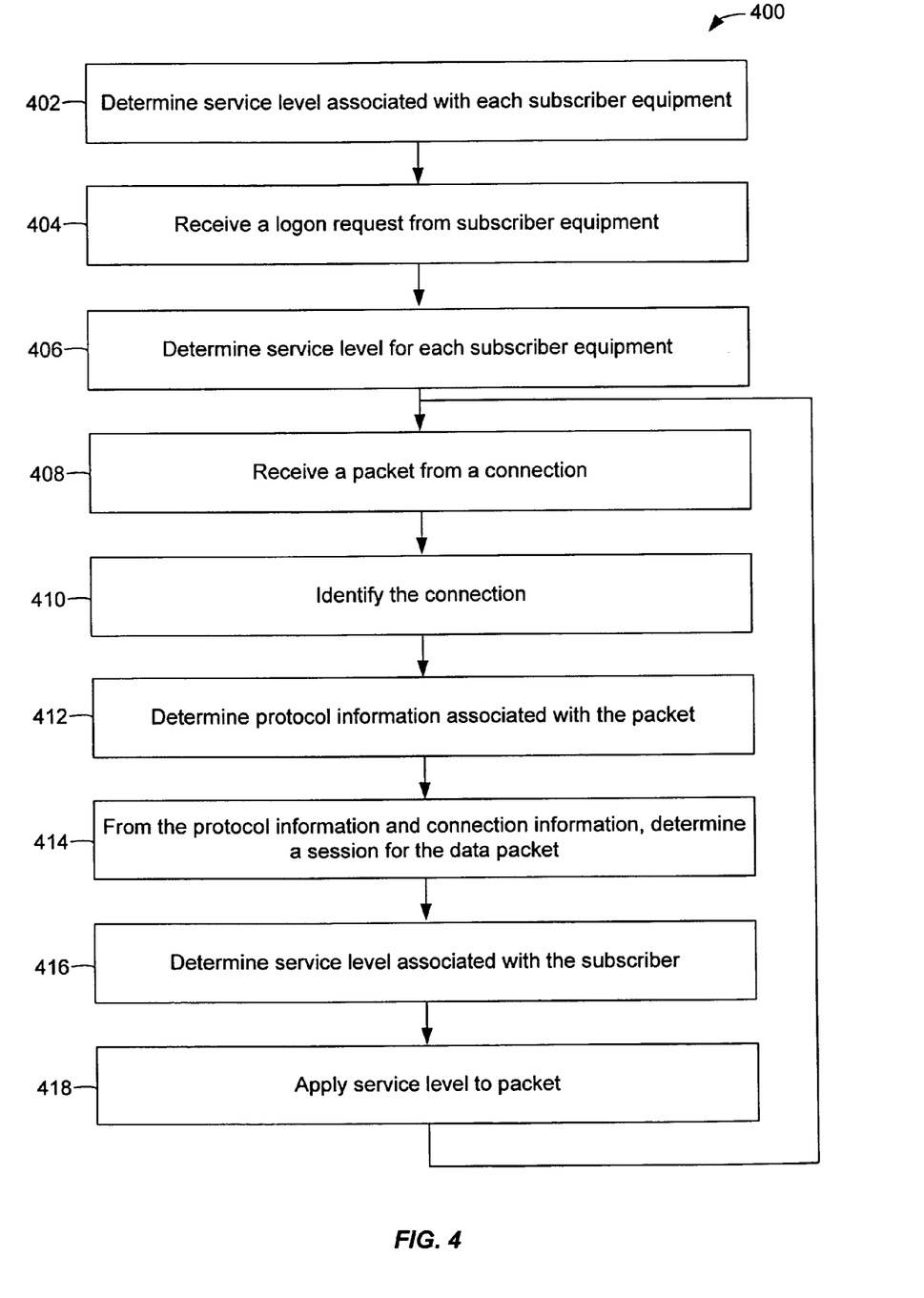
FIG. 4 illustrates a flow chart of a method for applying different service levels to user sessions according to one embodiment of the present invention.

FIG. 4 illustrates a flow chart 400 of a method for applying different service levels to user sessions according to one embodiment of the present invention. In step 402, service levels are determined for each user terminal and are stored. The service levels will be used later when data packets are received from the subscriber equipment.

In step 404, a logon request is received from a user terminal. The terminal may be any kind of equipment that is associated with a user. For example, the terminal may be customer premise equipment, a computer, access equipment, a router etc.

In step 406, a service level is determined for the user. For example, a service level agreement that specified a certain data rate may have been agreed upon with the user. A QoS or a CoS may be associated with the user terminal.

In step 408, a data packet is received from a connection. In one embodiment, the connection may be transferring data for multiple users or just one user.

In step 410, the connection is identified. For example, the connection may be connected to an interface, such as a port or logical port, in router 8 or service level router 12.

In one embodiment, connection identifiers have been assigned to each connection interface. Thus, the CID that is assigned to the data packet is based on the interface in which it was received. As discussed above, if multiple users are transferring data through the same connection, then multiple users will have the same CID associated with them.

In step 412, protocol information is determined for the data packet. In one embodiment, the protocol information is a protocol field in the data packet.

In step 414, from the protocol information and connection identifier, a session for the data packet is determined. In one embodiment, a SID is determined using the protocol information and CID.

The combination of both of the protocol information and connection identifier may be translated into a SID. Different SIDs are determined based on different protocols and connections. The SID uniquely identifies a session associated with the user or the user equipment that sent the data packet.

In step 416, a service level is determined for the SID. The service level is the data transfer rate that has been previously determined. The predetermined service level may be retrieved using the SID.

In step 418, the determined service level is then applied to the data packet. Thus, data packets received for users are transferred at a data rate that is agreed upon as the appropriate level of service. Even though multiple users may be transferring data through a connection in multiple sessions, data packets for each user session will have a specific service level applied to them. The method then reiterates to step 408, where additional data packets are received.

Because user sessions are identified based on both the connection, such as port or logical port information, and protocol information, such as layer-2 and layer-3 information, embodiments of the present invention support various types of sessions on the same physical connection simultaneously. For example, a PPPoE subscriber and a DHCP subscriber could be using one physical ATM connection or interface simultaneously. These two subscribers may be offered a service level tailored to them. Thus, data packets from the PPPoE subscriber are transferred at a first service level and data packets from the DHCP subscriber are transferred at a second service level. The service levels are enforced even though the two subscribers are transferring data packets on the same physical connection. This allows for fine grained data flow management where every subscriber can have a unique set of parameters applied to their data packets.

While the present invention has been described using a particular combination of hardware and software implemented in the form of control logic, it should be recognized that other combinations of hardware and software are also within the scope of the present invention. The present invention may be implemented only in hardware, or only in software, or using combinations thereof.

The above description is illustrative but not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

What is claimed is:

1. A method for applying service levels to a plurality of packets of data received via a plurality of connections, each session comprising one or more sessions, the method comprising:

for each session in the one or more sessions, associating a service level with the session:
receiving user identification information via a connection;

in response to receiving the user identification information, assigning a session identifier to the session;
identifying a service level associated with the user identification information; and
associating the service level with the session identifier, wherein the service level is determined at least in part by the user identification information; and
associating a connection identifier and a protocol of the connection with the session identifier;
for each data packet of the plurality of data packets, applying a service level to the data packet received via one of the plurality of connections, wherein applying the service level to the data packet further comprises:
determining a communication protocol associated with the data packet;
determining the connection identifier associated with the connection;
determining a session identifier of a session associated with the data packet using the connection identifier and the communication protocol; and
determining a service level for the data packet associated with the session identifier; and
transferring the data packet at the determined service level.

2. The method of claim 1, wherein the service level comprises at least one of a quality of service (QoS) level and a class of service (CoS) level.

3. A method for applying a service level to a packet of data, the method comprising:
initializing a user device for transferring data packets through a connection, the connection transferring data packets for a plurality of user devices including the user device;
determining a service level that is associated with the user device, wherein determining a service level that is associated with the user device includes:
in response to receiving the user identification information, assigning a session identifier to a session associated with the user device;
identifying a service level associated with the user device; and
associating a service level with the session identifier, wherein the service level is determined at least in part by the user identification information;
storing the service level associated with the user device;
receiving a plurality of data packets from the connection, the data packets received from the plurality of user devices;
determining a service level to apply to the one or more data packets based on the stored service level associated with the user device wherein determining a service level to apply to the data packet based on the stored service level further comprises:
determining a communication protocol associated with the data packet;
determining the connection identifier associated with the connection;
determining a session identifier of a session associated with the data packet using the connection identifier and the communication protocol; and
determining a service level for the data packet associated with the session identifier; and
applying the service level to the data packet.

4. The method of claim 3, wherein the plurality of data packets are associated with the plurality of protocols.

5. The method of claim 3, wherein associating a data packet in the plurality of data packets with the user device comprises determining a connection identifier for the connection.

6. The method of claim 5, wherein associating a data packet in the plurality of packets with the user device comprises determining a session identifier for the data packet.

7. The method of claim 6, wherein the stored service level is associated with a session identifier, and
wherein determining the service level to apply to the data packet comprises using the determined session identifier to determine the stored service level.

8. The method of claim 6, wherein the plurality of data packets may be transferred using a plurality of protocols,
wherein the session identifier is determined based on the protocol associated with the data packet,
wherein session identifiers for different data protocols in the plurality of data protocols are determined differently.

9. The method of claim 3, wherein the service level comprises at least one of a quality of service (QoS) level and a class of service (CoS) level.

10. A method for determining and applying a service level to a data packet, wherein a plurality of data packets of a plurality of protocols are received from a plurality of connections and each connection comprises one or more sessions, the method comprising:
for each session in the one or more sessions, establishing a service level, wherein establishing a service level comprises:
receiving user identification information via a connection;
assigning a session identifier to a session associated with the user identification information;
identifying a service level associated with the user identification information; and
associating the service level with the session identifier, wherein the service level is determined at least in part by the user identification information; and
associating a connection identifier and a protocol of the connection with the session identifier;
for each data packet in the plurality of packets, applying a service level to the packet, wherein applying a service level to the packet comprises:
determining a connection in the plurality of connections from which the packet was received;
determining a protocol in the plurality of protocols associated with the received packet;
determining a session identifier for a session associated with the data packet based on the determined protocol and the determined connection; and
determining a service level that is associated with the session identifier; and
transferring the received packet at the determined service level.

11. The method of claim 10, further comprising receiving a logon request from a user.

12. The method of claim 11, further comprising:
associating the service level with a session for the user;
storing the associated service level, wherein determining the service level that is associated with the session comprises using the stored service level to determine the service level.

13. The method of claim 10, wherein determining the session for the received packet based on the determined protocol comprises determining a session identifier, wherein different session identifiers are assigned based on different protocols.

14. The method of claim 10, further comprising:
for all packets received for the session, transferring the packets at the determined service level.

15. The method of claim 10, wherein determining the connection comprises determining a connection identifier.

16. The method of claim 15, wherein determining the session comprises determining a session identifier based on the determined protocol and connection identifier.

17. The method of claim 16, wherein a plurality of service levels are associated with a plurality of session identifiers, wherein determining the service level comprises using the session identifier to determine the service level in the plurality of service levels.

18. The method of claim 10, wherein the service level comprises at least one of a quality of service (QoS) level and a class of service (CoS) level.

19. An apparatus for applying a service level to data packets, the apparatus comprising:
session assigner configured to assign a service level to a each of a plurality of sessions, wherein each session may be assigned a different level of service, wherein for each session, the session assigner is configured to:
receive user identification information via a connection;
assign a session identifier to a session associated with the user identification information;
identify a service level associated with the user identification information; and
associate the service level with the session identifier;
associate a connection identifier and a protocol of the connection with the session identifier;
a service level assigner configured to assign a service level to each of a plurality of data packets, each data packet being associated with one of the plurality of sessions, the service level assigner further comprising:
a connection determiner configured to identify a connection in which a data packet was received, wherein the connection determiner determines a connection identifier of the connection;
a protocol identifier configured to identify protocol information for the data packet;
a session determiner configured to determine a session identifier for a session associated with the data packet based on the identified connection and identified protocol information; and
a service level determiner configured to determine a service level associated with the identified session identifier; and
a transmitter configured to transfer the data packet at determined service level.

20. The apparatus of claim 19, wherein the connection comprises at least one of a port and a logical port.

21. The apparatus of claim 19, wherein the connection is associated with the connection identifier (CID).

22. The apparatus of claim 19, wherein the protocol information comprises a protocol field in the data packet.

23. A system for applying a service level to data packets, the system comprising:
a plurality of user devices;
a plurality of sessions, wherein at least one session is associated with a user device in the plurality of user devices;
a router configured to receive a plurality of data packets from the plurality of user devices through a plurality of connections, wherein the router comprises a service level router, the service level router,
for each session in the plurality of sessions, the service level router is configured to:
receive user identification information via a connection;
assign a session identifier to a session associated with the user identification information;
identify a service level associated with the user identification information: and
associate the service level with the session identifier;
associate a connection identifier and a protocol of the connection with the session identifier;
for each data packet in the plurality of data packets, the service level router is configured to:
identify a connection from which the data packet was received, wherein the connection determiner determines a connection identifier of the connection;
identify protocol information for the data packet;
determine a session identifier for a session associated with the data packet based on the identified connection and identified protocol information; and
determine the service level associated with the identified session identifier; and
apply a service level to the data packet based on the session.

24. The system of claim 23, wherein data packets are received for two or more of user devices for a single connection in the plurality of connections.

* * * * *